June 29, 1926.

C. H. POWELL 1,590,313

REGISTERING INSTRUMENT

Filed Feb. 14, 1924

Inventor
Clarence H. Powell
Attorney Parker & Burton

Patented June 29, 1926.

1,590,313

UNITED STATES PATENT OFFICE.

CLARENCE H. POWELL, OF DETROIT, MICHIGAN, ASSIGNOR, BY DIRECT AND MESNE ASSIGNMENTS, TO MOTOR INDUSTRIES INC., OF CHICAGO, ILLINOIS, A CORPORATION OF ILLINOIS.

REGISTERING INSTRUMENT.

Application filed February 14, 1924. Serial No. 692,654.

This invention relates to registering instruments, and is illustrated as embodied in an automobile speedometer having means to show the fuel consumed in traveling the distance shown by the odometer indicator. An object of the invention is to provide an inexpensive device capable of embodiment in, or control by, the odometer mechanism of an ordinary speedometer, and which will permit the driver to calculate readily the mileage he is securing from his gasoline or other fuel.

With this object in view, the device comprises generally a register which shows a running or cumulative total of fuel consumed since the last time it was re-set, and which is automatically re-set to a zero position under the control of the odometer mechanism so that the total shown on the fuel register will at all times and automatically correspond to the total miles shown on the odometer indicator, thus permitting miles-per-gallon or other units of fuel consumption to be arrived at by simple division. In one desirable arrangement each time the odometer passes its zero position, as it does in most speedometers after every hundred miles, it operates a re-set device which automatically returns the fuel register to a corresponding zero position. Preferably the re-set device by which the odometer is manually returned to its zero position is also arranged to operate the re-set device of the fuel register. As shown in the drawings, the fuel register may include a spring which is tensioned by the step-by-step advance of a fuel-registering dial under the control of a pawl and ratchet, the pawl being tripped by the odometer re-set device, or by the passage of the odometer indicator through its zero position, to permit the spring to re-set the fuel registering dial.

Other objects and features of the invention, including a novel fuel register adapted for use in combination with an odometer, and other novel combinations of parts and desirable particular constructions, will be apparent from the following description of one illustrative embodiment shown in the accompanying drawings, in which.

Figure 1:
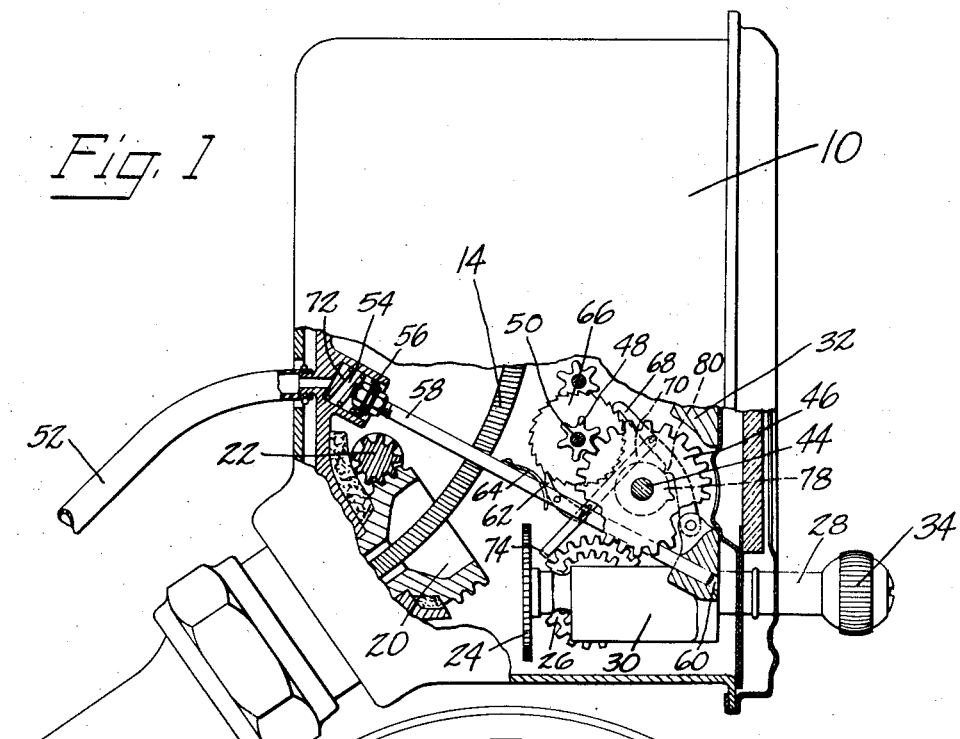
Figure 1 is a view in side elevation, partly broken away on the line 1—1 of Fig. 2, showing my invention embodied in an automobile speedometer.
Figure 2:
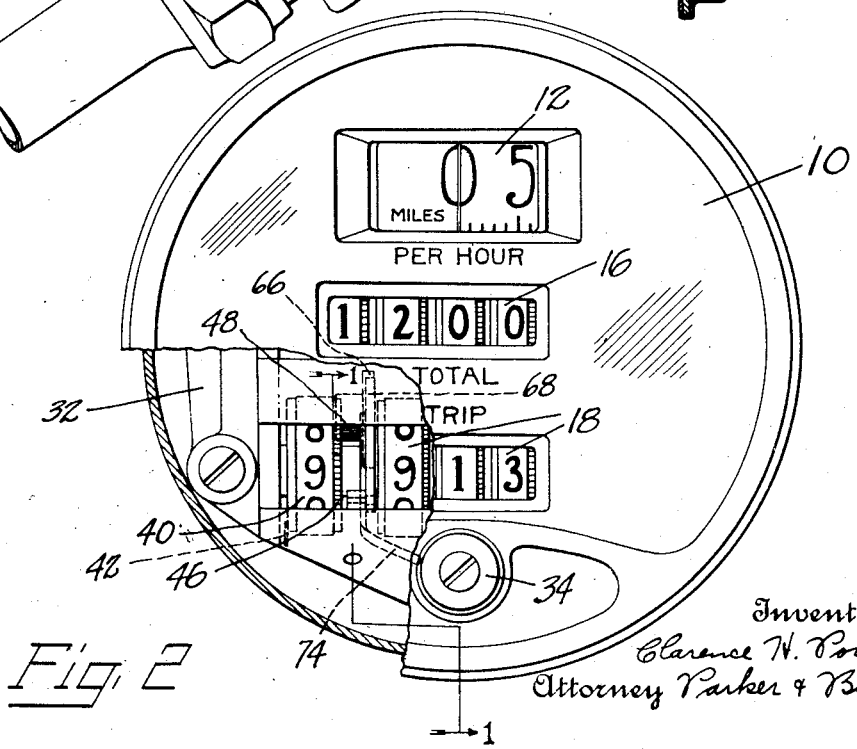
Fig. 2 is a view of the speedometer in front elevation, partly broken away just behind the front cover.

In these figures the invention is shown embodied in an automobile speedometer 10 having a speedometer dial or indicator 12 operated by a shaft 14 driven from the transmission or a front wheel in the usual manner, and also having a season mileage indicator 16 and a trip mileage indicator 18 driven from shaft 14 through a worm 20 and worm gear 22. The trip indicator 18 is re-set by a gear 24, brought into mesh with a gear 26 controlling the indicator wheels by pulling out a plunger 28 sliding in a boss 30 of a frame bracket 32, and which is turned by a knurled head 34 on the plunger 28. All these parts may be and are shown as being of standard construction, and more complete description is, therefore, not considered necessary.

According to the present invention, there is also provided a fuel register, including in the form shown a dial or indicator wheel 40, which may be graduated in gallons, and which incloses a torsion or hair spring (not shown) constantly urging the dial toward a zero position determined by a stop 42 which engages part of bracket 32. The dial 40 is shown as being mounted on the usual shaft 44 provided for the indicator wheels of the trip odometer 18; and it is provided with a gear wheel 46 driven by a small gear 48 on the shaft 50 (shaft 50 also preferably being one of the shafts of the regular odometer mechanism).

The gear 48 is advanced to drive the dial 40 by any suitable fuel-controlled means. While any fuel-measuring means may be used, I have shown in the drawings connections intended to be controlled by a fuel-feeding vacuum tank of standard construction, the vacuum tank being regarded for the purposes of the present invention as a rough-and-ready fuel-measuring device which will give results sufficiently accurate for a driver who wishes to know within fairly close limits how many miles he is getting per gallon. If greater accuracy is required, a special fuel-measuring device may be provided.

As a convenient fuel-controlled driving means, then, the drawings show a connection 52 from the vacuum tank, arranged to exhaust a cylinder 54 once each time the vacuum tank is filled. A piston 56 in the vacuum cylinder is connected by a connecting rod 58, slidably guided in an opening 60 in bracket 32, with a pawl 62 held by a spring 64 against a ratchet wheel 66 secured to the gear 48. The ratchet wheel is held, when pawl 62 moves back to engage the next tooth, by a second pawl 68 pivotally supported on the bracket 32. A connecting link 70 is pivoted to pawl 68 and has a slot embracing a pin on the tail of pawl 62, so that normally spring 64 holds pawl 68 as well as pawl 62 against ratchet wheel 66, and also so that by pushing upwardly on the link 70 both pawls will be disengaged from the ratchet wheel to permit dial 40 to be returned by its torsion spring to zero position. A spring 72 in cylinder 54 operates pawl 62 in the opposite direction from the suction of the vacuum tank, so that each time the tank is filled and emptied the ratchet wheel is advanced one tooth.

According to an important feature of the invention, re-setting of the dial 40 by tripping pawls 62 and 68 is controlled by the trip odometer 18, so that each time the odometer is in its zero position, whether by reason of manipulation of re-set plunger 28 or by reason of the dials passing the hundred mile position, the dial 40 is also and automatically returned to its zero position. Thus the tail 74 of link 70 is bent around until it lies in the path of gear 24, so that each time plunger 28 is pulled out to re-set the odometer the gear 24 will push the link upwardly to trip both pawls 62 and 68, thus permitting re-setting of dial 40 by its tensioned spring. Moreover, the last wheel 18 of odometer 18 has a cam 78 arranged to engage a projection 80 on pawl 68 as the odometer passes the hundred mile mark, thus tripping pawl 68 directly and tripping pawl 62 through link 70.

In operation, each time the vacuum tank is filled and emptied once, the ratchet wheel 66 is advanced one tooth, and the dial 40 is advanced to a corresponding degree, e. g., to show one-tenth of a gallon, or such other amount as corresponds to the capacity of the vacuum tank. This continues until at 100 miles the odometer 18 again starts at its 00.0 position, whereupon cam 78 automatically returns the dial 40 to zero. If in the meantime the driver operates re-set 28—34 to return odometer 18 to zero, gear 24 engages the tail 74 of link 70 and pushes it upwardly, thus also returning dial 40 to zero.

While one illustrative embodiment of my invention has been described, it is not my intention to limit its scope to that particular embodiment. The term "odometer", as used in the claims, is intended to be construed broadly to cover any registering mechanism showing total work performed in consuming fuel registered by the fuel register.

What I claim is:

1. A registering instrument comprising, in combination, an odometer having re-set mechanism, a register constructed and arranged to show cumulative totals of fuel consumed, and a zero re-set device for the fuel register which is operated by the odometer re-set mechanism.

2. A registering instrument comprising, in combination, an odometer having a zero position through which it passes automatically after registering its maximum figure, a register constructed and arranged to show cumulative totals of fuel consumed, and a zero re-set device for the fuel register which is automatically operated by passage of the odometer through its zero position.

3. A registering instrument comprising, in combination, an odometer having a re-set mechanism and having a zero position through which it passes automatically after registering its maximum figure, a register constructed and arranged to show cumulative totals of fuel consumed, and connections from the odometer for re-setting the fuel register automatically whenever the odometer re-set mechanism is operated and whenever the odometer passes through its zero position.

4. A registering instrument comprising, in combination, an odometer, a fuel register, and connections from the odometer for controlling the reading of the fuel register.

5. A registering instrument comprising, in combination, an odometer, a fuel register, and connections from the odometer for re-setting the fuel register.

6. A registering instrument comprising, in combination, an odometer, a fuel register, step-by-step mechanism for operating the fuel register, means for turning the fuel register to a zero position when released from said mechanism, and a device operated by the odometer for releasing the fuel register from said mechanism to permit said means to return the register to its zero position.

7. A registering instrument comprising, in combination, an odometer, a fuel register, fuel-controlled means for operating the register step by step, a stop determining a zero position for the fuel register, a spring urging the register toward said stop, and means operated by the odometer for releasing the register from the fuel-controlled means and permitting the spring to move the register to the zero position determined by the stop.

8. A registering instrument comprising, in combination, an odometer, a fuel register, a suction connection and a ratchet co-operating to advance the register and adapted to be operated by a vacuum tank, and a connection from the odometer for re-setting the fuel register.

9. A fuel register comprising, in combination, a dial, a pawl and a ratchet for advancing the dial, fuel-controlled means for operating the pawl and ratchet, a spring tensioned by the advancing dial, a stop to determine the zero position of the dial, and re-set means to trip the pawl and permit the spring to return the dial to the position determined by the stop.

10. A fuel register comprising, in combination, a dial having a ratchet wheel attached thereto, a pair of pawls engaging the ratchet wheel, fuel-controlled means operating one of the pawls to advance the dial, means for returning the dial to a zero position, and a re-set device to release both pawls and permit the dial-returning means to act.

11. In a device comprising an odometer having zero setting mechanism and a register to show the amount of fuel consumed, a zero-setting device for the fuel register which is operated by the odometer zero-setting mechanism.

12. In a device comprising an odometer having an indicator passing through a regular cycle including a zero position, and a register to show the amount of fuel consumed, a zero-setting device for the fuel register which is operated automatically by passage of the indicator through its zero position.

13. In combination, an odometer, a fuel register, and means for insuring that said register shall indicate at all times the total fuel consumed during the mileage indicated on the odometer.

14. In combination, an odometer, a fuel register, and means for automatically resetting said register when the readings on the odometer change other than progressively.

In testimony whereof, I sign this specification.

CLARENCE H. POWELL.